United States Patent
McKenna (10) Patent No.: US 12,330,701 B2
(45) Date of Patent: Jun. 17, 2025

(54) ACCURATE DETECTION OF TRACK OCCUPANCY WITHIN TRAIN TRACKING SYSTEMS

(71) Applicant: Siemens Mobility, Inc., New York, NY (US)

(72) Inventor: Monica McKenna, North Berwick, ME (US)

(73) Assignee: Siemens Mobility, Inc., New York, NY (US)

( * ) Notice: Subject to any disclaimer, the term of this patent is extended or adjusted under 35 U.S.C. 154(b) by 103 days.

(21) Appl. No.: 18/475,663

(22) Filed: Sep. 27, 2023

(65) Prior Publication Data

US 2025/0100600 A1  Mar. 27, 2025

(51) Int. Cl.
*B61L 25/02* (2006.01)
*B61L 27/10* (2022.01)

(52) U.S. Cl.
CPC ............. *B61L 25/025* (2013.01); *B61L 27/10* (2022.01)

(58) Field of Classification Search
CPC ................................. B61L 25/025; B61L 27/10
See application file for complete search history.

(56) References Cited

U.S. PATENT DOCUMENTS

| | | | | |
|---|---|---|---|---|
| 11,827,256 B1* | 11/2023 | Sapp | ......................... | B61L 1/18 |
| 2005/0076716 A1* | 4/2005 | Turner | .................. | B61L 23/044 |
| | | | | 73/579 |
| 2006/0074544 A1* | 4/2006 | Morariu | ................... | B61L 27/16 |
| | | | | 701/19 |
| 2008/0296441 A1* | 12/2008 | Anderson | ............. | B61L 23/044 |
| | | | | 246/121 |
| 2013/0284859 A1* | 10/2013 | Polivka | .................... | B61L 1/188 |
| | | | | 246/34 R |
| 2013/0334373 A1* | 12/2013 | Malone, Jr. | ........... | B61L 23/166 |
| | | | | 246/2 R |
| 2017/0255824 A1* | 9/2017 | Miller | ...................... | H04L 67/12 |
| 2019/0145791 A1* | 5/2019 | Rempel | ................ | G08G 1/0116 |
| | | | | 701/410 |
| 2022/0185350 A1* | 6/2022 | Kindt | ........................ | B61L 1/18 |

FOREIGN PATENT DOCUMENTS

EP  3925853 A1  12/2021

* cited by examiner

*Primary Examiner* — Long T Tran (57) ABSTRACT

A train tracking system includes a train tracking module, a plurality of input sources providing train related information, and one or more interface(s) associated with the train tracking module, wherein the train tracking module is configured via computer executable instructions and through operation of a processor to receive the train related information from the plurality of input sources via the one or more interface(s), determine a position of a train within a train track map, the position of the train corresponding to a track location of the train in a track network, and wherein the train tracking module further comprises a learning algorithm, the train tracking module being configured to, utilizing the learning algorithm, determine an unexpected occupancy of the track location.

14 Claims, 4 Drawing Sheets

ACCURATE DETECTION OF TRACK OCCUPANCY WITHIN TRAIN TRACKING SYSTEMS

BACKGROUND

1. Field

Aspects of the present disclosure generally relate to the field of railway technology, such as guiding and ensuring safety of railway traffic. More specifically, aspects relate to accurate detection of track occupancy within dispatch systems in connection with railway vehicles, e.g., trains, such as freight trains.

2. Description of the Related Art

Controlling movement of trains in a modern environment is a complex process. Collisions with other trains must be avoided and regulations in areas such as grade crossings must be complied with.

In an example of freight trains, freight train routes are planned, but allowing a given train to travel a planned route and specifics of exactly which track the trains are on is controlled by dispatchers. Dispatchers use a 'Dispatch System' to control switches and signals to clear the routes for the trains, as well as issuing authorities for areas of track that are not controlled by signals. For the purposes of overseeing and controlling this routing, the dispatchers need to be aware of where the freight trains are. Symbols for the trains in route are shown on a display in the dispatch system to indicate the trains' locations. This is called train tracking.

Accurate knowledge of where the trains are allows for safer and more efficient train operations. In North American for example, there is limited in-track detection devices for knowing the exact location of the train. Thus, there may be a need for improved train tracking.

SUMMARY

Briefly described, one or more embodiments of the present disclosure provide for systems and methods for accurate detection of track occupancy, for example in connection with dispatch systems.

A first aspect of the present disclosure provides a train tracking system comprising train tracking module, a plurality of input sources providing train related information, and one or more interface(s) associated with the train tracking module, wherein the train tracking module is configured via computer executable instructions and through operation of at least one processor to receive the train related information from the plurality of input sources via the one or more interface(s), determine a position of a train within a train track map, the position of the train corresponding to a track location of the train in a track network, and wherein the train tracking module further comprises a learning algorithm, the train tracking module being configured to, utilizing the learning algorithm, determine an unexpected occupancy of the track location.

A second aspect of the present disclosure provides a method for train tracking, the method comprising, through operation of at least one processor, collecting train related information from a plurality of input sources via one or more interface(s), determining a position of a train within a train track map based on the train related information, the position of the train corresponding to a track location of the train in a track network, and determining an unexpected occupancy of the track location utilizing a learning algorithm.

A third aspect of the of the present disclosure provides a non-transitory computer readable medium encoded with processor executable instructions that when executed by at least one processor, cause the at least one processor to carry out a method for train tracking as described herein.

DETAILED DESCRIPTION

To facilitate an understanding of embodiments, principles, and features of the present disclosure, they are explained hereinafter with reference to implementation in illustrative embodiments. In particular, they are described in the context of systems and methods for train tracking.

Various technologies that pertain to systems and methods will now be described with reference to the drawings, where like reference numerals represent like elements throughout. The drawings discussed below, and the various embodiments used to describe the principles of the present disclosure in this disclosure are by way of illustration only and should not be construed in any way to limit the scope of the disclosure.

Figure 1:
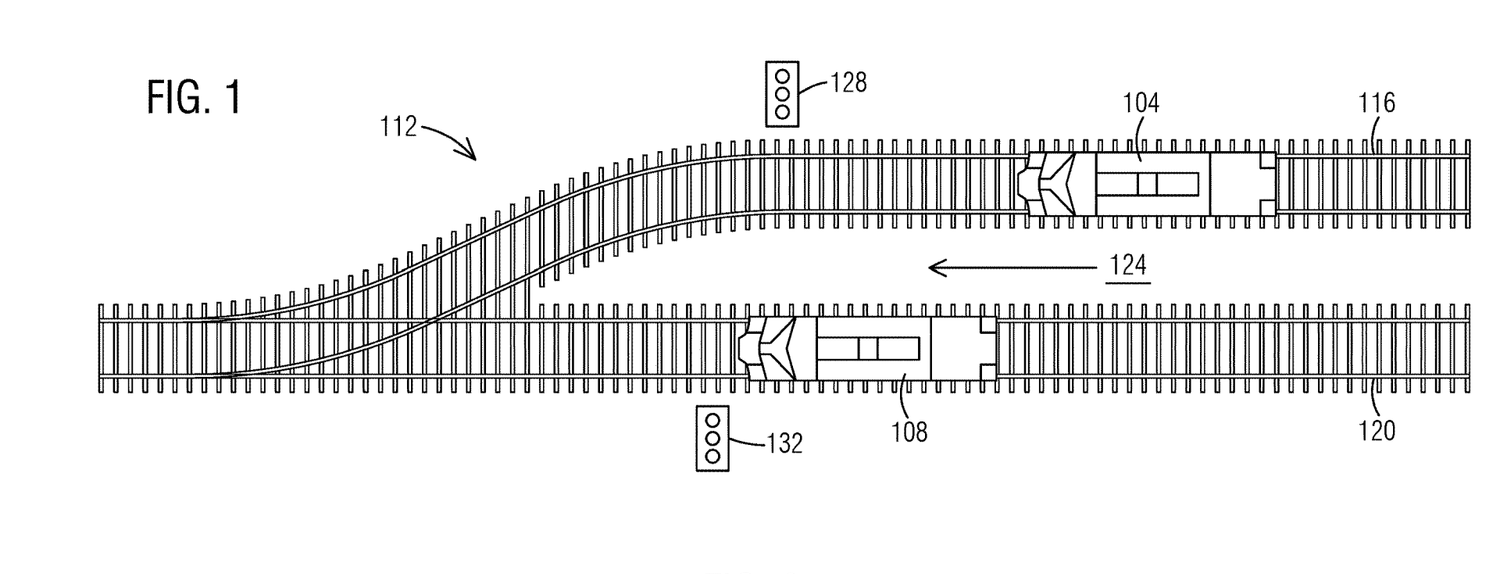
FIG. 1 illustrates a schematic of train tracking in accordance with an exemplary embodiment of the present disclosure.

FIG. 1 illustrates a schematic of train tracking in accordance with an exemplary embodiment of the present disclosure.

The following embodiments and examples are described in connection with freight trains. However, it should be noted that the described systems and methods may be applicable to other types of railway vehicles, such as passenger trains. Examples of trains include streetcars, light rail vehicles, automatic (airport) shuttles, metros, commuter trains, EMU (Electric Multiple Units), DMUs (Diesel Multiple Units), and high-speed trains etc.

With reference to FIG. 1, freight trains 104 and 108 travel within a train network, wherein only a section 112 of the train network is shown. The train network section 112 is a small part of a much larger train network comprising many train tracks and railway components. The train 104 travels on track 116 and train 108 travels on track 120. In this example, both trains 104 and 108 travel in the same direction, as shown by indicator 124. The train network is displayed on a screen or display as a track map. The screen/display is coupled to a dispatch system. The dispatch system will be described in more detail in connection with FIG. 2 and FIG. 3. In short, dispatch systems are used for train tracking, more specifically for overseeing and controlling routing of the trains 104, 108. Thus, symbols for the trains 104, 108 in route are shown on the display in the dispatch system to indicate the trains' locations.

Further, railway signals 128 and 132 are illustrated and displayed. The railroad industry employs wayside signals to inform train operators, and wayside maintainers, of various types of operational parameters. For example, colored wayside signal lights, such as signals 128 and 132, are often used to inform a train operator as to whether and how a train may enter a block of track associated with the wayside signal light. The status (color) of wayside signal lamps is sometimes referred to in the art as the signal aspect. One simple example is a three-color system known in the industry as Automatic Block Signaling (ABS), in which a red signal indicates that the block associated with the signal is occupied, a yellow signal indicates that the block associated with the signal is not occupied but the next block is occupied, and green indicates that both the block associated with the signal and the next block are unoccupied.

Figure 2:
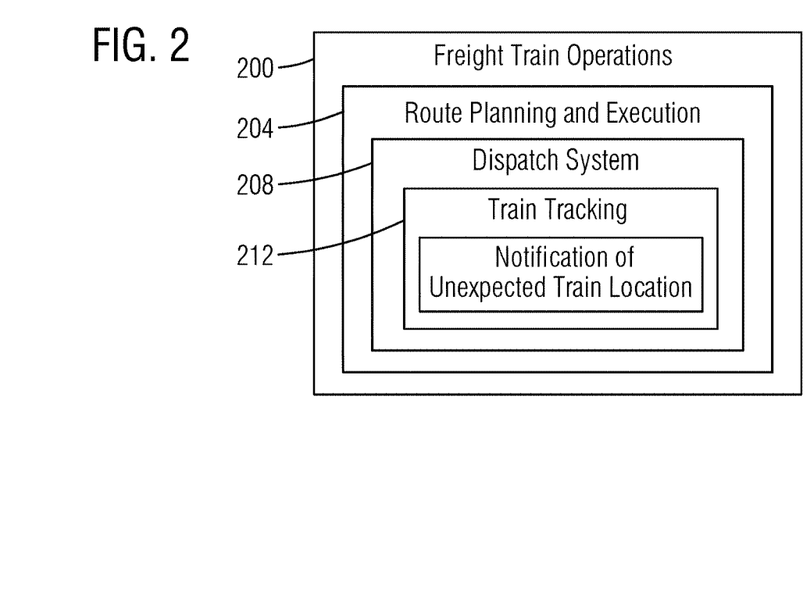
FIG. 2 illustrates a schematic of train operations in accordance with an exemplary embodiment of the present disclosure.

FIG. 2 illustrates a schematic of train operations in accordance with an exemplary embodiment of the present disclosure.

In general, freight train operations 200 require route planning and execution 204. Dispatch systems, such as dispatch system 208, are part of the route planning and execution 204. Train tracking 212, i.e., knowing where the trains are, is a key part of the dispatch system 208. Train operations 200 including route planning and execution 204, dispatch system 208 and train tracking 212 include manual and automated steps and processes.

The dispatch system 208 is a computer aided dispatch system, herein also referred to as CAD system 208. Typically, the CAD system 208 is operably coupled to a back-office server system (not illustrated), herein also referred to as BOS system, which is a storehouse for speed restrictions, track geometry and wayside signaling configuration databases. The CAD system 208 can be integrated in the BOS system. The CAD system 208 is configured to display and dispatch information, data and messages to other components or sub-systems, such as the BOS system. The CAD system 208 comprises a human-machine-interface (HMI), e.g., computer and screen/display, and can be configured to display information on the screen, such as information/data collected by different components or equipment, for example on-board units of trains, wayside interface units, etc. Further, the CAD system 208 is configured such that information/data or commands can be entered manually by an operator, for further processing by the CAD system 208 and/or the BOS system.

Train tracking 212 includes a train tracking module 220 including an ability to provide notifications of unexpected train locations. The described train tracking system and associated method are about awareness of an occupied track when there was not an expectation that the given track was occupied. An ability to accurately inform dispatchers or operators when a track section may be unexpectedly occupied by a train improves safety of train operations, e.g., freight train operations.

Figure 3:
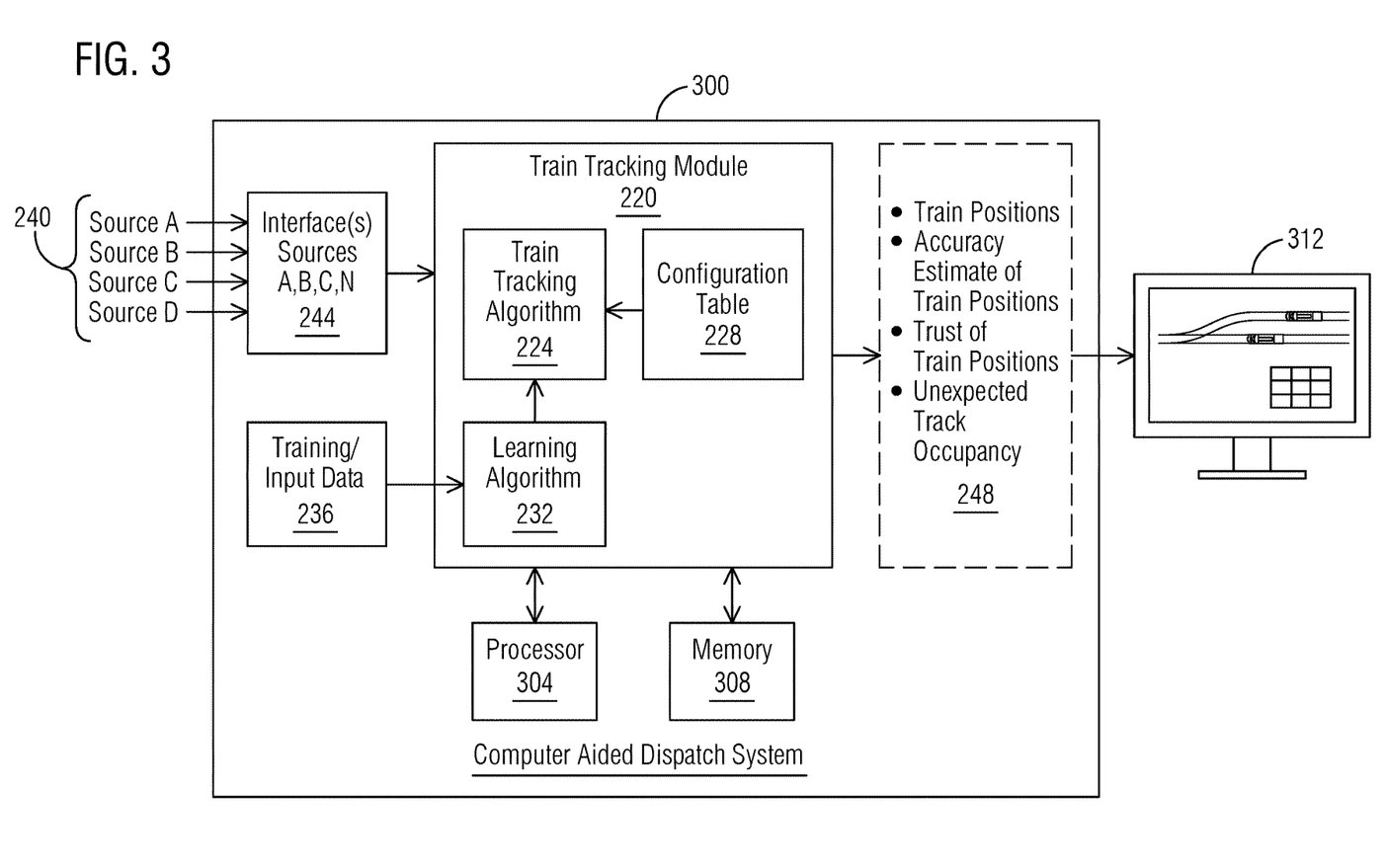
FIG. 3 illustrates a schematic of a train tracking module in accordance with an exemplary embodiment of the present disclosure.

If a track location is occupied and the dispatcher is not aware of it, this is a major safety issue. The term 'dispatcher' as used herein is an admin/administrator of the dispatch system 300. If a track location is not actually occupied but the dispatcher/dispatch system 208 reports that the location is occupied, it can lead to significant business losses (due to having to slow down or stop trains). Repeated lack of correct occupancy reports can also lead to a safety issue as the dispatcher may stop paying attention to the reports.

The described systems and methods use multiple data sources to accurately determine a train location and additionally use learning algorithm(s), that utilize input and training data such as dispatcher feedback and other data and information to—over time—have accurate warnings of when there is track occupation and when there is not, which is described in more detail in the following.

FIG. 3 illustrates a schematic of a train tracking module in accordance with an exemplary embodiment of the present disclosure.

Train tracking today in North America for freight trains often uses track circuit indicators and form-based authorities. Track circuit indicators only indicate within track segments where the train is located, as the track circuit is 'tripped' as the train wheels drive over the circuit. Track circuits can vary in length, typically from 2500 feet to 10,000 feet. The indication just indicates that a train has tripped the circuit and in the track circuit block, not specifically where in the track circuit block the train is located. Tripping a track circuit does not provide any information about which train tripped the circuit, so current dispatch systems must rely on assumptions about the progression of track circuits along a route, which can at times be misleading.

Some newer systems may use global positioning system (GPS) location messages from trains. GPS devices on trains in the field today are not all high precision, and it may locate the train incorrectly on a parallel track. Other dispatch systems may not even use GPS messaging to locate trains. Also, today's systems may not display to a dispatcher a train that was not already 'in tracking', which means that a train that was not expected to be in a location may not show up at all in the dispatch system.

In dark territory (track sections without signals and track circuits), current systems rely on form-based authorities that have been issued for the trains to travel on certain track sections. The length of the form-based authority can vary in length and can be as long as several miles. Form-based authorities in most systems rely on the train crews reporting their location to dispatchers for the release of authorities, roll-up (shortening) of authorities, and requesting new authorities. Train crews often use visual inspection for indication of their location (such as milepost signs along the track). When a form-based authority is active for a train, it only indicates that the train is within the bounds of that authority. If a train is not expected on a track, there is no current detection of such an unexpected track occupancy in dark territory.

As previously noted, accurate knowledge of where trains are allows for safer and more efficient train operations including the ability to provide accurate notifications of unexpected trains in track locations. Thus, systems and methods are provided for improved train tracking. More specifically, provided herewith are a configurable system and a configurable method to accurately place trains on a train track map (determination of a location or position of a train), including calculations and/or determinations of train positions, accuracy estimates of train positions, a concept of 'trust' in a train's location, and unexpected track occupancies.

The configurable system comprises a train tracking module 220, a plurality of input sources 240 providing train related information and one or more interface(s) 244 coupled to the train tracking module 220 for receiving the information of the input sources 240.

In an exemplary embodiment of the present disclosure, the train tracking module 220 is configured to execute train tracking, illustrated by train tracking algorithm 224, utilizing at least one processor 304 and memory 306. The train tracking module 220 is configured via computer executable instructions and through operation of the processor 304 to receive the train related information from the plurality of input sources 240 via the one or more interface(s) 244, determine a position of a train within a train track network (train map), estimate an accuracy of the position of the train, determine a location attribute for the position of the train, and determine and report unexpected track occupancy, see output 248.

The train tracking module 220 is configured to perform calculation(s), determination(s) and estimates 248, based on the multiple input sources 240, e.g. source A, source B, source C, source N. It should be noted that there may be more input sources 240. The module 220 is configured to use input sources 240 depending on for example availability and/or usefulness. The module 220 may only utilize two sources 240 or may utilize twenty sources 240 for performing the algorithm 224. The input sources 240 may include for example input from one or more trains, e.g., locomotive with GPS of the trains, input from wayside crossing equipment, e.g., a track circuit etc. Other types of input sources 240 are described in more detail with reference to FIG. 4.

The one or more interface(s) 244 are generally configured to provide, for example to collect, obtain or receive, data from the sources A, B, C and N. An example for an interface is a computing interface or software implemented interface which defines interactions between multiple software intermediaries. An example for a computing interface is an application programming interface (API), wherein the API interacts with separate software components or resources for providing, e.g., transferring or exchanging, data in an automated manner from the data sources 240 to the target application (module 220).

In another embodiment of the present disclosure, the train tracking module 220 comprises one or more learning algorithm(s) 232 utilizing training and input data 236. The train tracking module 220 is configured to, utilizing the learning algorithm 232, determine whether a determined track location is unexpectedly occupied by the train, and report such an unexpected track occupancy.

Further, a configuration table 228 is provided and configured to be accessed by the train tracking module 220 and utilized in the algorithm 224, wherein the location attribute ('trusted' or 'suspect') of the position of the train is determined based on the configuration table 228. The location attribute includes 'trusted' and 'suspect', e.g., a trusted position and a suspect position.

Furthermore, the train tracking module 220 is configured to provide accuracy estimates of the train positions. Such accuracy estimates may be expressed by percentage or other type of label, level, or degree. For example, a calculated or determined train position may have a 70% accuracy estimate associated with it, which means that the train position is mostly correct and can be trusted. A definition when or at what accuracy estimate percentage a train position can be trusted, is (manually) configurable for example by the dispatcher or operator.

The learning algorithm 232, training data 236, configuration table 228, level of trust and accuracy estimate will be described in more detail in connection with FIG. 4 and FIG. 5.

The train tracking module 220 can be an individual system and operably coupled to the computer aided dispatch system 300, or the train tracking module 220 can be integrated or implemented by the CAD system 300, as illustrated in FIG. 3. The processor 304 and memory 308 are part of the dispatch system 300. The train tracking module 220 may be embodied as software or a combination of software and hardware. In our example, the train tracking module 220 may be incorporated, for example programmed, into the CAD system 300.

The dispatch system 300 comprises or is coupled to a display 312, wherein the output 248 of the train tracking module 220 is displayed via the display 312 to a dispatcher or operator. The output 248 can be shown as data or messages, and within/part of track maps. The calculated positions of trains are integrated and shown via the track map.

Figure 4:
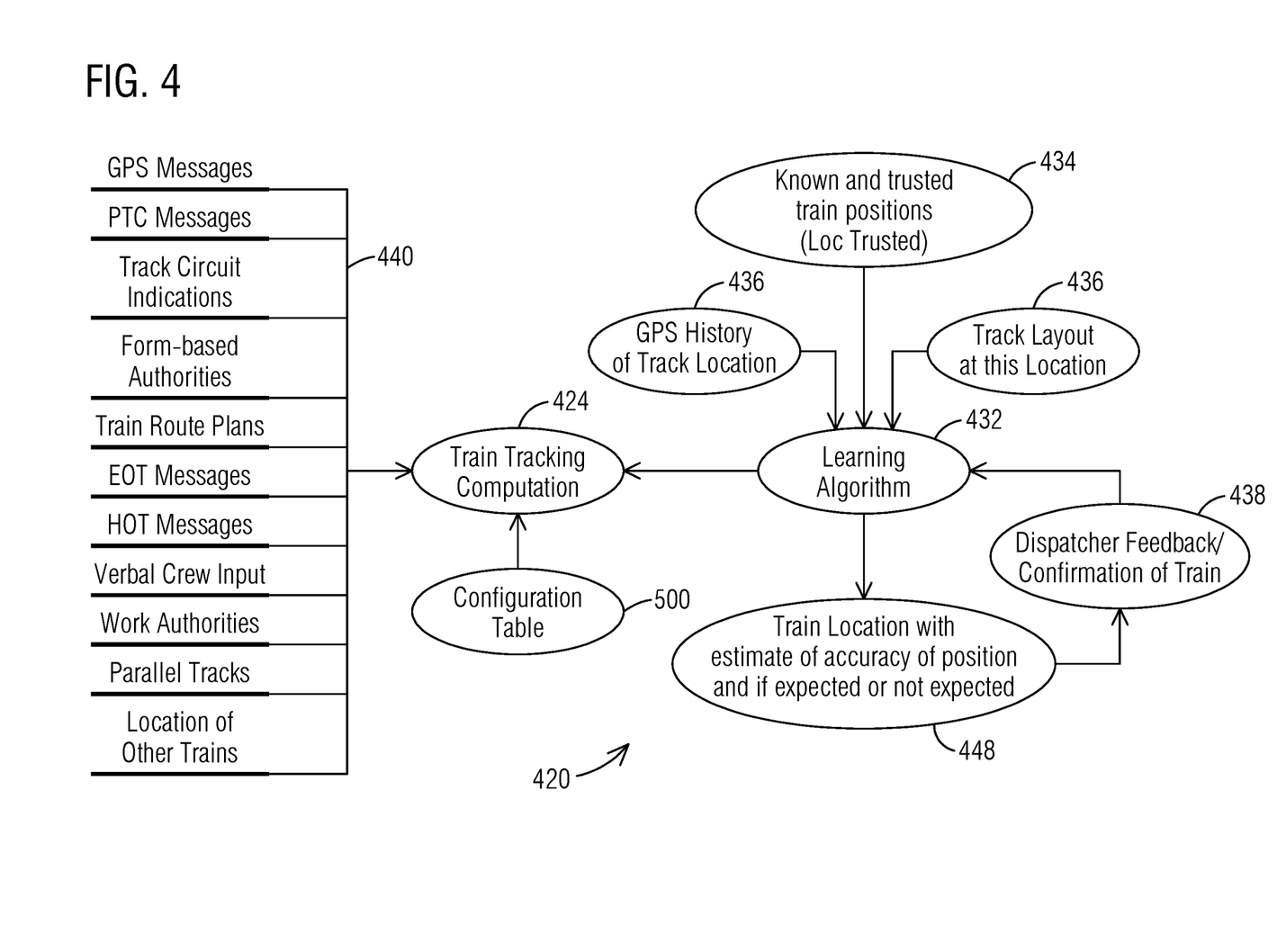
FIG. 4 illustrates a schematic of an embodiment a train tracking module including various input sources in accordance with an exemplary embodiment of the present disclosure.

FIG. 4 illustrates a schematic of an embodiment a train tracking module including various input sources in accordance with an exemplary embodiment of the present disclosure.

Figure 5:
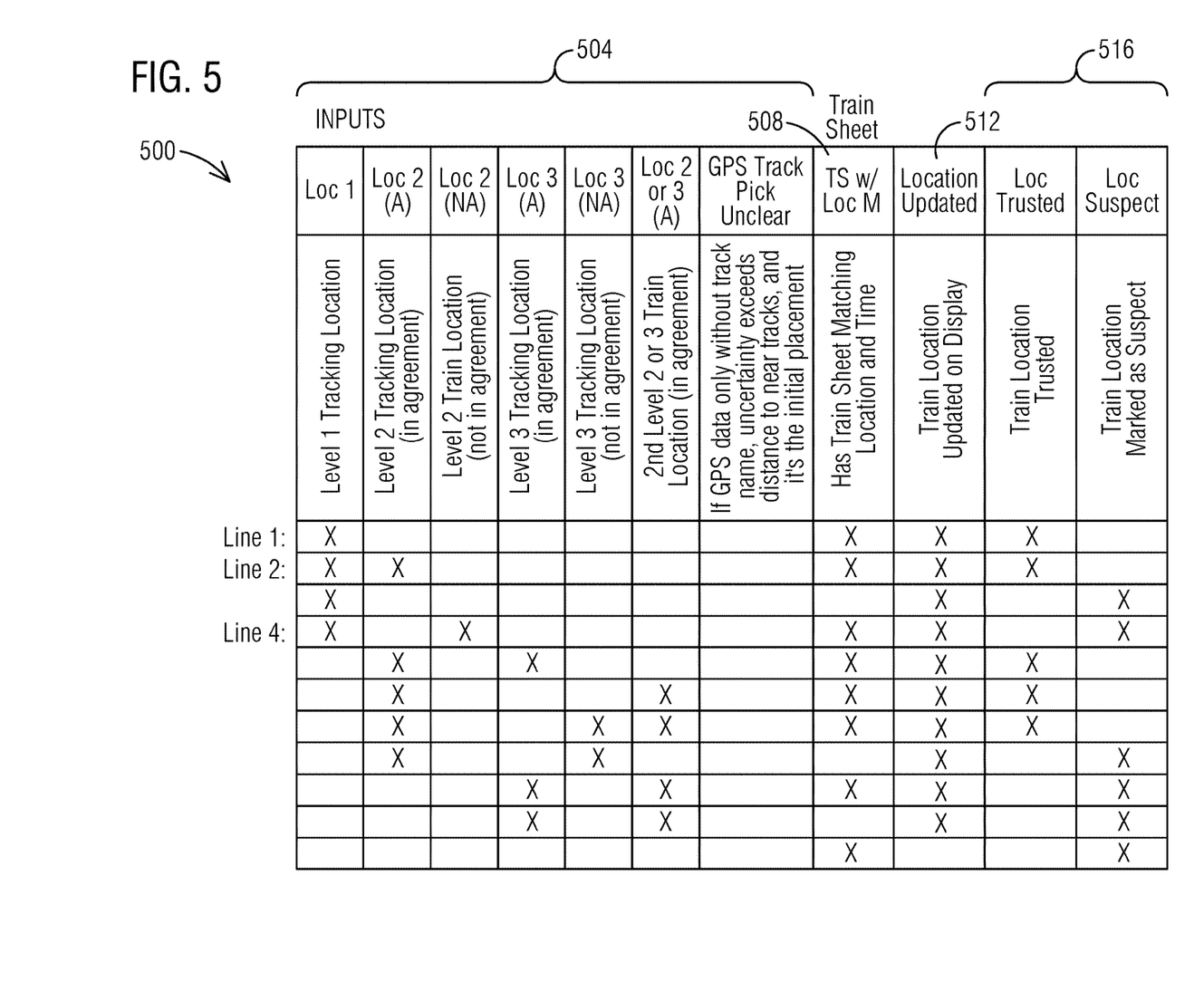
FIG. 5 illustrates a configuration table in connection with a train tracking module in accordance with an exemplary embodiment of the present disclosure.

Train tracking module 220 of FIG. 3 illustrates a generic module, whereas train tracking module 420 of FIG. 4, in connection with configuration table 500 of FIG. 5, comprises concrete features, such as input sources 440 and training/input data 436 for learning algorithm 432.

In accordance with an exemplary embodiment of the present disclosure, an objective is to use all available sources of information (input sources 440) for a specific application or use case. In our example, the input sources 440 include train planned routes, if there are tracks parallel to the train location and their distance apart, PTC (positive train control) location messaging include GPS accuracy, additional GPS (global positioning system) messages from the train with accuracy when available, EOT (end of train device) and HOT (head of train device) inputs, verbal information from a train crew, authorities for the train, locations of other trains, work authorities for track locations.

All input sources 440 are combined via the train tracking module 420 and train tracking algorithm 424 to (most) accurately place the trains on the track map, see output 448. Again, it should be noted that the list of input sources 440 can vary for each application or system, depending for example on how many and which types of input sources 440 are available, and/or on the type of dispatch system 300 being able to process the input sources 440.

Additionally, the train tracking module 420 utilizes the learning algorithm 432, including 'good' data/information and dispatcher feedback 438 to (over time) determine and report accurate warnings when there is an unexpected track occupancy and when there is not.

The learning algorithm 432 uses a plurality of data and information as training/input data. The learning algorithm 432 can be configured to learn for all track locations (in the track network/map) over time, for example based on given GPS data for a specific location and whether the train location/position is a 'trusted location' or not. This means that the learning algorithm 432 learns from all determined train positions that are trusted, see input 434. The location data for the locations in combination with the location attribute 'trusted' is an important input for the learning algorithm 432. Further inputs for the learning algorithm 432 are dispatcher feedback/confirmation of train 438, GPS history of track locations and track layout at the specific location 436. The GPS history and track layout at a specific location are accessed when an unexpected track occupancy has been detected. In such cases, GPS history and track layout helps to evaluate whether a train has been at this unexpected location before or it is even possible that a train is at that location. The dispatcher feedback/confirmation of train 438 includes that the dispatcher (manually) confirms (or does not confirm) an unexpected train and tack occupancy within the track network.

As noted earlier, the train tracking module 420 is configured to receive and process all input information and data from sources 440 and calculate and/or determine various outputs 448. Essentially, the outputs 448 indicate if a train is in a specific track location/track block or not.

In an exemplary embodiment of the present disclosure, when the information of the outputs 448, specifically the information regarding the position/location of the train, does not agree with the train's planned route, for example based on a train schedule or train sheet, or the train's identifier is not the expected identifier for a location, information about the location's GPS history 436 as well as track layout at the location 436 is accessed, as well as results from the learning algorithm 432 to indicate a likelihood of a train being in that location. When there is a train in an unexpected location, the dispatcher and dispatch system 300 will be informed, with information about the likelihood of that unexpected occupancy, based on for example the GPS history 436 and the learning algorithm 432. Then, the dispatcher confirms, by calling the train or using other methods, if there is indeed an unexpected train in that location. The dispatcher's response feeds into the learning algorithm 432 for the next occurrence of a similar situation, see feedback/confirmation of train 438 as input in learning algorithm 432.

For areas with inconsistent/unreliable GPS or very close tracks, such as in a track ladder, the train tracking module 420, specifically the learning algorithm 432, is configured to learn/train over time to correctly identify, using all inputs 440, 434, 436, 438, when a train is in an unexpected location and can avoid false warnings—though any possible unexpected occupancy is reported to the dispatch system 300/dispatcher, just at a lower alert level. With respect to input 434, when trains are not unknown, e.g., train location is determined and trusted, confirmed for example by PTC messages, these confirmed train locations feed into the learning algorithm 432. Then when a train is unexpected, the learning algorithm 432 is configured to use the training for the specific location and GPS data to determine whether the train is really at that location or not.

Further outputs 448 are location attributes associated with the train locations ('suspect location' or 'trusted location') and an estimate of an accuracy of the train locations. The concept of suspect versus trusted locations comprises a calculation using the available input sources 440 to determine if the location shown for the train is trusted and at what accuracy. This may affect the decisions made by the dispatcher and/or the dispatch system 300 and improve safety and efficiency.

The following is a table of the inputs and outputs for the train tracking computation/algorithm 424:

| Inputs 440 to Train Tracking Algorithm 424 | Outputs 448 of Train Tracking Algorithm 424 |
| --- | --- |
| GPS Messages from Trains<br>PTC Messages from Trains<br>Track Circuit Indications for Signaled Track Locations<br>Form-Based Authorities for Dark Territory<br>Train Route Plans - Overall Route and Current Route Plan<br>EOT (end of train) messages - when available from train<br>Hot (head of train) messages - when available from train<br>Verbal crew location input - when reported to Dispatcher<br>Work Authorities - for work crews working on track<br>Parallel Tracks - when train is located near a parallel track<br>Location of Other Trains - known locations of other trains in the area<br>Configuration Table 500 for Combining Inputs and Trust Level<br>Settings for Inputs - configurable, see FIG. 5 | Location of train, accuracy estimate of location, and trust level of location |

The following table lists inputs 436 and outputs 448 for the learning algorithm 432:

| Inputs 436 to Learning Algorithm 432 | Output 448 of Learning Algorithm |
| --- | --- |
| Train tracking computation result - if a train is in an unexpected location<br>GPS History for that Track Location - data from GPS messages for this location over time<br>Track layout at this location - information such as the curvature of the track at this location, if there are parallel or ladder tracks<br>History of Dispatcher confirmation or rejections of reports of trains at this location | Report of if a train is unexpectedly in a location, whether the location information is trusted or suspect, along with an estimate of the accuracy of the position. |

FIG. 5 illustrates a configuration table in connection with a train tracking module, as illustrated for example in FIG. 3 and FIG. 4, in accordance with an exemplary embodiment of the present disclosure.

FIG. 5 illustrates an example of a configuration table 500. It should be noted that the configuration table 500 may look different in other scenarios, applications or use cases. Inputs 504, 508 and outputs/conclusions 516 are individually configurable.

Configuration table 500 comprises multiple inputs 504, 508 and outputs/conclusions 516. The outputs/conclusions 516 include the location attributes 'trusted location' (Loc Trusted) and 'suspect location' (Loc Suspect). 'Trusted location' means that the determined position of a specific train within the train network (train map) is trustworthy and can be treated as correct. 'Suspect location' means that a position of a train cannot be trusted and is likely incorrect or at least uncertain and needs further investigation.

The inputs 504 are based on the plurality of input sources 440 (see FIG. 4), e.g., GPS messages, PTC messages, track circuit indications, etc. The inputs 504 are labelled as Loc 1 (location 1), Loc 2, Loc 3, etc., wherein each location is assigned a specific trust level. Location 1 (Loc 1) comprises level 1 tracking location with a highest level of trust (most reliable and most correct source of position information, based for example on historic knowledge). The levels can be chosen or categorized depending on reliability and accuracy. For example, GPS messages from high precision GPS systems may be given a trust level of 1. Verbal crew input may be given a trust level of 2 or 3. Depending on availability and reliability of the input sources 440, the inputs 504 with trust level are configurable and can be manually changed, for example by the dispatcher or an operator.

The example of the configuration table 500 comprises the following inputs 504 with trust level:
Loc 1—Level 1 Tracking Location
Loc 2(A)—Level 2 Tracking Location (in agreement)
Loc 2 (NA)—Level 2 Tracking Location (not in agreement)
Loc 3(A)—Level 3 Tracking Location (in agreement)
Loc 3 (NA)—Level 3 Tracking Location (not in agreement)
Loc 2 or 3(A)—$2^{nd}$ Level 2 or 3 Tracking Location (in agreement)
GPS Track Pick Unclear—If GPS data without track name, uncertainty exceeds distance to near tracks, and it's the initial placement.

Another input to the calculation/algorithm 424 of the train tracking module 420 is information from a train sheet 508 (TS w/Loc M). The train sheet comprises the movement of trains and includes information where a train should be at what time, similar to a schedule. With respect to the train sheet information 508, the algorithm/method 424 determines whether an obtained position information, for example Loc 1 and/or Loc 2 matches the location and time in the train sheet 508 of the respective train.

Outputs 516 are based on combinations of the trust levels, with a column for an output if the location is to be trusted (Loc Trusted). For example, if there is a trust level 2 input and a trust level 3 location input that agrees, that location is then trusted. If there is a trust level 1 and a trust level 2 input that have different locations (not in agreement), that location is then suspect (Loc Suspect). For example, with respect to line 1 of the table 500, it is defined that when Loc 1 (provided for example by PTC messages) is available and matches the information of the train sheet 508, then the location of train can be trusted, see check mark X for Loc Trusted. In contrast, with respect to line 4, Loc 1 (provided for example by PTC messages) is available, but Loc 2 (provided for example by track circuit indications) is not in agreement, i.e., provides a different location, then the location is considered as suspect and not trustworthy, see check mark X for Loc Suspect. As noted, the inputs, outputs and conclusions are (manually) configurable. For example, in a different scenario, an outcome/conclusion 516 of line 4 may be Loc Trusted (and not Loc Suspect), because the input 504, 508 of line 4 is defined such that the determined position of the train can be trusted.

Further, the outputs 516 can be associated and/or based on accuracy estimates of the determined train positions. As previously noted, such accuracy estimates may be expressed by percentage or other type of label, for example levels 1, 2, etc. In the example where GPS messages from high precision GPS systems are given a trust level of 1, this assigned trust level of 1 may also indicate a high accuracy of the position which corresponds to a high accuracy estimate. Inputs with trust level of 2 or 3 correspond to lower accuracy estimates, wherein a combination of the different inputs with different accuracy estimates lead to a combined accuracy estimate. For example, with respect to line 2 of table 500, a Level 1 input (Loc 1) combined with a Level 2 input in agreement (Loc 2A) has an output 516 that it is a trusted location (Loc Trusted) and may have a combined accuracy estimate of 1.5 (may correspond to 90%, based on a 100% accuracy of Loc 1 and an 80% accuracy of Loc 2).

The configuration table 500 further comprises information 512 which indicates whether the train location is to be updated in the track map shown on the display 312 of the dispatch system 300. This information is also individually configurable.

Summarizing, the described system and method allow use of multiple sources of information for determining the train's position with a high degree of accuracy, the combining and comparing of those sources to determine if the resulting position can be trusted as well as associating an accuracy estimate of the location. An additional key difference is that there is some configuration ability that allows tuning of the algorithms without having to release a new software version. Features of the systems and methods include:
A train not in official "tracking" may still be reported as occupying a track location/block.
Multiple inputs are combined in a smart configurable algorithm to determine track occupancy.
The system learns from determined (known) track locations that are trusted, GPS collected data, track layouts, and dispatcher feedback to give more accurate findings on if a given track location/block is occupied or not to avoid false high-level warnings.

It should be appreciated that acts associated with the above-described methodologies, features, and functions (other than any described manual acts) may be carried out by one or more data processing systems, such as for example train tracking module 220, 420, via operation of at least one processor 224. As used herein, a processor corresponds to any electronic device that is configured via hardware circuits, software, and/or firmware to process data. For example, processors described herein may correspond to one or more (or a combination) of a microprocessor, CPU, or any other integrated circuit (IC) or other type of circuit that is capable of processing data in a data processing system. As discussed previously, the module 220 and/or processor 224 that is described or claimed as being configured to carry out a particular described/claimed process or function may correspond to a CPU that executes computer/processor executable instructions stored in a memory in form of software and/or firmware to carry out such a described/claimed process or function. However, it should also be appreciated that such a processor may correspond to an IC that is hard wired with processing circuitry (e.g., an FPGA or ASIC IC) to carry out such a described/claimed process or function.

In addition, it should also be understood that a processor that is described or claimed as being configured to carry out a particular described/claimed process or function may correspond to the combination of the module 220/processor 224 with the executable instructions (e.g., software/firmware apps) loaded/installed into a memory (volatile and/or non-volatile), which are currently being executed and/or are available to be executed by the processor 224 to cause the processor 224 to carry out the described/claimed process or function. Thus, a processor that is powered off or is executing other software, but has the described software installed on a data store in operative connection therewith (such as on a hard drive or SSD) in a manner that is setup to be executed by the processor (when started by a user, hardware and/or other software), may also correspond to the described/claimed processor that is configured to carry out the particular processes and functions described/claimed herein. Further, it should be understood, that reference to "a processor" may include multiple physical processors or cores that are configured to carry out the functions described herein.

It is also important to note that while the disclosure includes a description in the context of a fully functional system and/or a series of acts, those skilled in the art will appreciate that at least portions of the mechanism of the present disclosure and/or described acts are capable of being distributed in the form of computer/processor executable instructions (e.g., software and/or firmware instructions) contained within a data store that corresponds to a non-transitory machine-usable, computer-usable, or computer-readable medium in any of a variety of forms. The computer/processor executable instructions may include a routine, a sub-routine, programs, applications, modules, libraries, and/or the like. Further, it should be appreciated that computer/processor executable instructions may correspond to and/or may be generated from source code, byte code, runtime code, machine code, assembly language, Java, JavaScript, Python, Julia, C, C#, C++, Scala, R, MATLAB, Clojure, Lua, Go or any other form of code that can be programmed/configured to cause at least one processor to carry out the acts and features described herein. Still further, results of the described/claimed processes or functions may be stored in a computer-readable medium, displayed on a display device, and/or the like.

The invention claimed is:

1. A train tracking system comprising:
   train tracking module,
   a plurality of input sources providing train related information, and
   one or more interface(s) associated with the train tracking module,
   wherein the train tracking module is configured via computer executable instructions and through operation of at least one processor to
      receive the train related information from the plurality of input sources via the one or more interface(s),
      determine a position of a train within a train track map, the position of the train corresponding to a track location of the train in a track network, and
   wherein the train tracking module further comprises a learning algorithm, the train tracking module being configured to, utilizing the learning algorithm,
      determine an unexpected occupancy of the track location,
   wherein the train tracking module is configured to determine a location attribute for the position of the train and for the unexpected occupancy of the track location, and an accuracy estimate of the position of the train in the track location,
   wherein the location attribute for the position of the train includes a trusted position and a suspect position,
   wherein the known positions of trains within the track network include trusted positions of track locations and
   wherein the configuration table comprises multiple inputs, the multiple inputs relating to the plurality of input sources, wherein each input comprises an assigned level of trust, and
   wherein the trusted position and the suspect position are based on different combinations of the levels of trust of the multiple inputs.

2. The train tracking system of claim 1,
   wherein the train tracking module is further configured to, utilizing the learning algorithm, generate a warning for the unexpected occupancy of the track location.

3. The train tracking system of claim 2,
   wherein the unexpected occupancy of the track location is determined based on a disagreement of the position of the train and a planned route of the train, or a disagreement between the train's identifier and an expected identifier for the track location.

4. The train tracking system of claim 1,
   wherein training/input data for the learning algorithm comprise known positions of trains within the track network, global positioning system (GPS) history for the track location, track layout information of the track location, history of reports including confirmations or rejections of trains at the track location, and/or dispatcher feedback.

5. The train tracking system of claim 4, further comprising:
   a dispatch system,
   wherein the train tracking module is operably coupled to the dispatch system, or wherein the train tracking module is implemented by the dispatch system, and
   wherein the confirmations or rejections of trains at the track location and dispatcher feedback are provided by a dispatcher via the dispatch system.

6. The train tracking system of claim 1, further comprising:
   a configuration table configured to be accessed by the train tracking module,
   wherein the location attribute including the trusted position and the suspect position is determined utilizing the configuration table.

7. The train tracking system of claim 1,
   wherein the plurality of input sources comprises global positioning system (GPS) messages, positive train control (PTC) messages, track circuit indications, form-based authorities, train route plans, end of train (EOT) messages, head of train (HOT) messages, verbal crew input, work authorities, parallel tracks, and/or locations of other trains.

8. A method for train tracking, the method comprising through operation of at least one processor:
   collecting train related information from a plurality of input sources via one or more interface(s),
   determining a position of a train within a train track map based on the train related information, the position of the train corresponding to a track location of the train in a track network,
   determining an unexpected occupancy of the track location utilizing a learning algorithm,
   determining, utilizing the learning algorithm, a location attribute for the position of the train and the unexpected occupancy of the track location, and an accuracy estimate of the position of the train in the track location, and
   accessing a configuration table,
   wherein the location attribute including a trusted position and a suspect position is determined utilizing the configuration table,
   wherein the configuration table comprises multiple inputs, the multiple inputs relating to the plurality of input sources, wherein each input comprises an assigned level of trust, and
   wherein the trusted position and the suspect position are based on different combinations of the levels of trust of the multiple inputs.

9. The method of claim 8, further comprising:
   generating a warning for the unexpected occupancy of the track location utilizing the learning algorithm.

10. The method of claim 8, wherein determining the unexpected occupancy of the track location is based on a disagreement of the position of the train and a planned route of the train, or a disagreement between the train's identifier and an expected identifier for the track location.

11. The method of claim 8, further comprising:
receiving, by the learning algorithm, training and input data, the training and input data comprising known positions of trains within the track network, global positioning system (GPS) history for the track location, track layout information of the track location, history of reports of trains at the track location, and/or dispatcher feedback.

12. The method of claim 11,
wherein the history of reports of trains at the track location includes confirmations or rejections of trains at the track location, and
wherein the confirmations or rejections of trains at the track location are provided by a dispatcher via the dispatch system.

13. The method of claim 8,
wherein the plurality of input sources comprises global positioning system (GPS) messages, positive train control (PTC) messages, track circuit indications, form-based authorities, train route plans, end of train (EOT) messages, head of train (HOT) messages, verbal crew input, work authorities, parallel tracks, and/or locations of other trains.

14. A non-transitory computer readable medium encoded with processor executable instructions that when executed by at least one processor, cause the at least one processor to carry out a method for train tracking as claimed in claim 8.

\* \* \* \* \*